(12) United States Patent
Collins

(10) Patent No.: US 6,726,410 B2
(45) Date of Patent: Apr. 27, 2004

(54) HUB ASSEMBLY

(75) Inventor: Anthony Collins, Belmont (AU)

(73) Assignee: B & J Manufacturing Company, Glenwood, IL (US)

( * ) Notice: Subject to any disclaimer, the term of this patent is extended or adjusted under 35 U.S.C. 154(b) by 67 days.

(21) Appl. No.: 10/192,794

(22) Filed: Jul. 10, 2002

(65) Prior Publication Data

US 2003/0021640 A1 Jan. 30, 2003

(30) Foreign Application Priority Data

Jul. 24, 2001 (AU) ............................................. PR6576

(51) Int. Cl.[7] ........................... B23D 71/00; B23D 71/08
(52) U.S. Cl. ..................................... 407/29.1; 407/29.13
(58) Field of Search ........................... 407/29.1, 29.12, 407/29.13, 29.14

(56) References Cited

U.S. PATENT DOCUMENTS

| | | | |
|---|---|---|---|
| 3,074,148 A | | 1/1963 | Hemmeter |
| 3,259,959 A | | 7/1966 | Tobey |
| 3,733,663 A | * | 5/1973 | Brucker .................... 407/29.13 |
| 3,747,177 A | * | 7/1973 | Jensen ....................... 407/29.12 |
| 4,012,819 A | * | 3/1977 | Willinger ................... 407/29.12 |
| 4,336,640 A | * | 6/1982 | Willinger ................... 407/29.12 |
| 5,033,175 A | * | 7/1991 | Jensen ....................... 407/29.12 |

* cited by examiner

Primary Examiner—Willmon Fridie, Jr.
(74) Attorney, Agent, or Firm—Edwin D. Schindler

(57) ABSTRACT

A hub assembly includes a core 10 of prior art construction held together between a pair of end plates 16, 18 by a cylindrical sleeve 14, the end plates 16, 18 being braced by flange 20 and nut 42 tightened on threaded end 22 of the sleeve 14. The end plates 16, 18 have an outer ring 34 with apertures 36 for hollow pins 38 to support the core 10 and a cavity 39 with flowable material 40 for balancing the hub. The pins 38 are held in place by plugs 58 which are inserted into the interior of the pin 38 and the pin expanded outwardly by compressing the plug 58 within the interior of said pin 38 to wedge the exterior of the pin 38 within an aperture 34 of the end plate 16, 18. Each end plate 16, 18 may be ribbed having radially extending apertures 60 to reduce weight and to aid ventilation of the hub.

19 Claims, 3 Drawing Sheets

HUB ASSEMBLY

FIELD OF THE INVENTION

The present invention relates to a rasp blade hub assembly and in particular to improvements in the pins, the end plates, the means by which the end plates are secured together and the balancing of the hub.

BACKGROUND ART

Prior art rasp blade hub assemblies are made in a variety of configurations but typically are constructed from a pair of end plates sandwiching therebetween a core of rasp blades, spacers and pins formed into a stack loosely held in place by the pins. The hub assembly is fixed onto the shaft of a motor to drive the hub assembly. Rasp blade hub assemblies are used for the buffing of worn tires to remove the tread preparatory to resurfacing or retreading of the tire for further use.

SUMMARY OF THE INVENTION

According to a first aspect of the invention there is provided a rasp blade hub assembly pin, said pin having a hollow interior and a smooth exterior. Preferably, said pin has at least one open end.

According to a second aspect of the invention there is provided a method for securing together components of a rasp blade hub assembly including a plurality of rasp blades, spacers and rasp blade hub pins, each said pin having a hollow interior and a smooth exterior, each said pin extending through apertures in said rasp blades and spacers of said hub assembly and terminating in an aperture in an end plate of the said hub assembly, each said pin being secured frictionally within said aperture of said end plate by inserting a plug into said hollow interior of said pin and expanding said pin outwardly compressing the plug within said hollow interior of said pin to wedge said exterior of said pin within said aperture of said end plate.

According to a third aspect of the invention there is provided a rasp blade hub assembly including a first and a second end plate, each of said end plates extending between an outer and an inner radius, a stepped flange portion at said inner radius of each said end plate, a cylindrical sleeve having at one end a flange for cooperating with said stepped flange portion of one of said end plates while having a threaded portion at the opposite end of said cylindrical sleeve for engaging a nut accommodated within the stepped flange portion of said other of said end plates, whereby with rotation of said nut along said threaded portion said end plates are drawn together or loosened depending on the direction of said rotation.

Preferably, a rasp blade hub assembly includes a core of a plurality of spacers, rasp blades and locating pins assembled with the end plates and cylindrical sleeve according to the third aspect of the invention, applied to the core and the assembly secured together by tightening the nut on the cylindrical sleeve drawing the end plates together about the core. As in the prior art, a core includes a stack of rasp blades separated by spacer means, said rasp blades and said spacer means being arranged in annular rows, each row comprising a plurality of arcuate rasp blades or spacer means arranged about the longitudinal axis of said core, each said rasp blade and each said spacer means having a plurality of apertures therein for accommodating said pins therethrough. Each end plate has apertures for accommodating the pins holding the rasp blades and spacers of the assembly in alignment.

Preferably, each of the end plates has a series of holes or apertures in the end plate producing a ribbed or spoked appearance allowing circulation of air about the end plate as the assembly rotates. Preferably, the end plates are of a truncated conical shape. Preferably, each end plate has a ring affixed to the perimeter at the outer radius, said ring having the apertures for accommodating the pins holding the rasp blades and spacers of the assembly in alignment. Preferably, the pins are pins according to the first aspect of the invention.

According to another aspect of the invention there is provided a rasp blade hub assembly including a first and a second end plate, each of said end plates extending between an outer and an inner radius, a ring fixed to the perimeter at the outer radius of the respective end plates of the assembly, each said ring having apertures therein for accommodating pins therethrough when forming said rasp blade hub assembly. Preferably, each said ring has at least one enclosed cavity therein. Preferably, said cavity is located on the inner radius of said ring towards the said perimeter, extends along said perimeter and is filled with flowable or fluidic material, for example, liquid or powder such as sand to enable the hub assembly to be balanced in use. An aperture or apertures is (are) provided in the ring for filling or emptying said cavity or cavities. While a single circumferential cavity is preferred, a number of separate cavities arranged about the perimeter may be used. Preferably, said ring is a hardened steel ring and is secured to the outer perimeters of each of said end plates by adhesive bonding, by welding, or by any other suitable method within the knowledge of a person skilled in the art.

According to yet a further aspect of the invention there is provided a rasp blade hub assembly including:

a pair of end plates, each end plate extending between an inner and an outer radius with a stepped portion at said inner radius;

a cylindrical sleeve having at one end a stepped flange for engaging the stepped portion of one of said end plates and at said other end a screw thread, a nut locatable in the stepped portion of the other of said end plates and engaging said screw thread of said cylindrical sleeve whereby movement of said nut along said screw thread moves said end plates towards or away from each other;

a pair of rings, each ring fixed along the outer radius of each of said end plates, each said ring having a plurality of apertures for accommodating therein respective pins, each said ring having at least one enclosed cavity for accommodating a flowable mass;

a plurality of pins, each said pin being hollow and secured within a respective aperture of said ring by a plug, said pin being expandable upon compression of said plug within said hollow of said pin; and said plurality of pins holding components of a core in alignment, said core including a stack of rasp blades separated by spacer means, said rasp blades and said spacer means being arranged in annular rows, each row comprising a plurality of arcuate rasp blades and spacer means arranged about the longitudinal axis of said core, each said rasp blade and each said spacer means having a plurality of apertures therein for accommodating said pins therethrough.

According to an even further aspect of the invention there is provided a method of assembly of a rasp blade hub assembly, said hub assembly including a pair of end plates, each end plate being annular and extending between an inner and an outer radius and having a stepped portion at said inner radius;

a cylindrical sleeve having at one end a stepped flange for engaging the stepped portion of one of said end plates and at said other end a screw thread, a nut locatable in the stepped portion of the other of said end plates and engaging said screw thread of said cylindrical sleeve;

a pair of rings, each ring fixed along the outer radius of a respective said end plate, each said ring having a plurality of apertures for accommodating therein respective pins, each said ring having at least one enclosed cavity for accommodating a flowable mass;

a plurality of pins, each said pin being hollow and secured within a respective aperture of at least one of said rings by a plug; and said plurality of pins holding components of a core in alignment, said core including a stack of rasp blades separated by spacer means, said rasp blades being arranged in annular rows, each row comprising a plurality of arcuate rasp blades arranged about the longitudinal axis of said stack, each said rasp blade and each said spacer means having a plurality of apertures therein for accommodating said pins therethrough, said method including a) forming said core by stacking a plurality of rasp blades in annular rows onto pins with each row separated by spacer means and made up of a plurality of arcuate rasp blades;

b) placing said core between said end plates with each end of said pins in an associated aperture of a respective ring;

c) inserting said sleeve so as to contact and extend between said inner radii of said end plates, applying a nut to said screw thread and tightening;

d) inserting a plug into the hollow interior of a pin, advancing said plug and compressing said plug in the region of said ring; and e) repeating step d) for all pins.

According to yet another aspect of the invention there is provided a method for securing together components of a rasp blade hub assembly including a plurality of rasp blades, spacers and rasp blade hub pins, each said pin having a hollow interior and a smooth exterior, each said pin extending through apertures in said rasp blades and spacers of said hub assembly and terminating in an aperture in an end plate of the said hub assembly, each said pin being secured frictionally within said aperture of said end plate by inserting a plug into said hollow interior of said pin and compressing the plug within said hollow interior of said pin in order to wedge said exterior of said pin within said aperture of said end plate, each said rasp blade hub pin extending between a first and a second said end plate, each of said end plates extending between an outer and an inner radius, a stepped flange portion at said inner radius of each said end plate, a cylindrical sleeve having at one end a flange for cooperating with said stepped flange portion of one of said end plates while having a threaded portion at the opposite end of said cylindrical sleeve for engaging a nut accommodated within the stepped flange portion of said other of said end plates, whereby with rotation of said nut along said threaded portion said end plates are drawn together or loosened depending on the direction of said rotation.

BRIEF DESCRIPTION OF THE DRAWINGS

Preferred embodiments of the invention will now be described with respect to the drawings in which.

PREFERRED MODES FOR PERFORMING THE INVENTION

Figure 3:
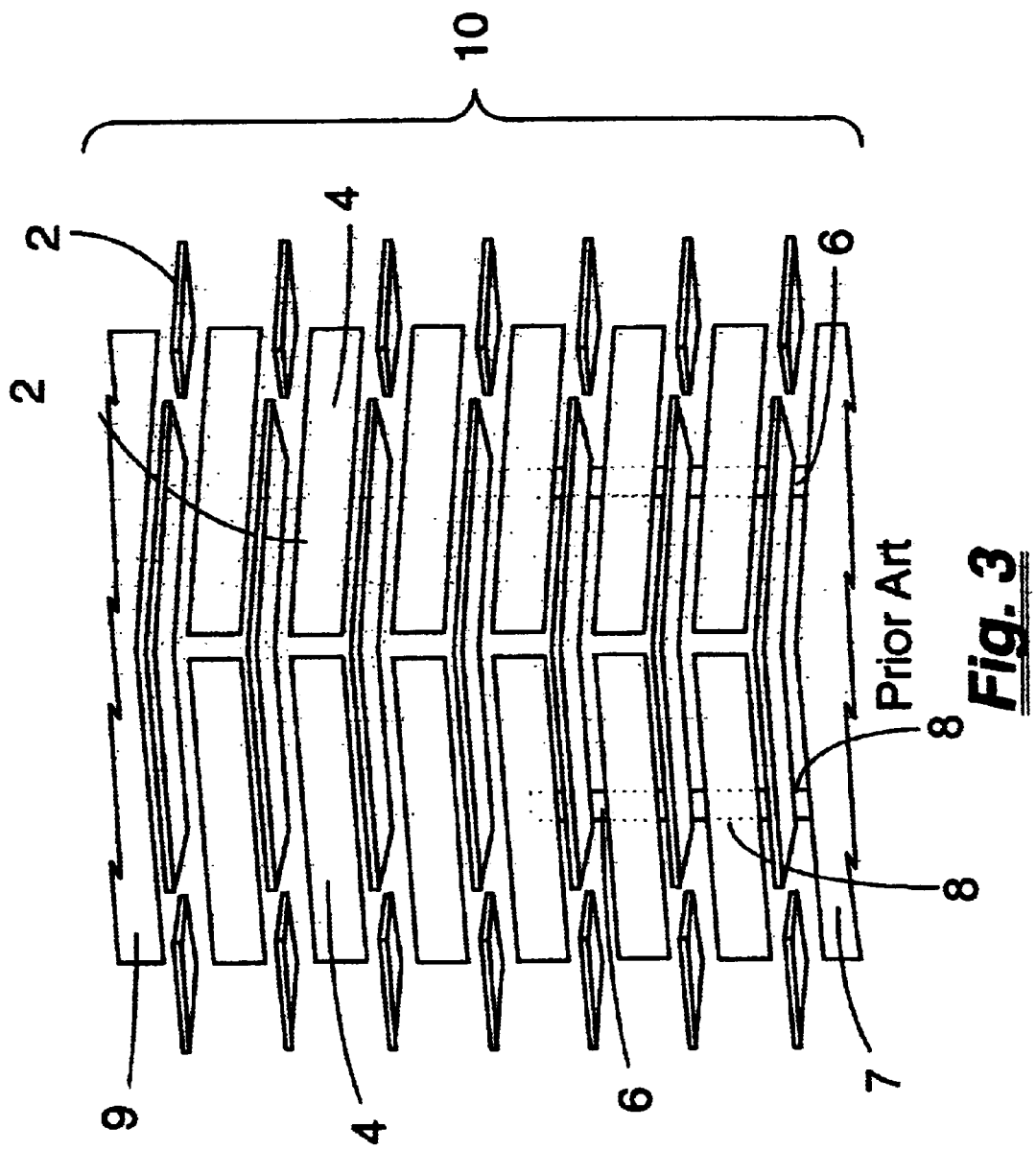
FIG. 3 shows a conventional core made up of spacers and rasp blades prior to assembly to form a rasp blade hub assembly according to the invention.

In the prior art, a rasp blade hub assembly includes an annular core 10, such as shown in FIG. 3, having a plurality of blades 2 separated by spacers 4 and held in a stack by pins 6 aligned through apertures 8 in each of said blades 2 and spacers 4. The core 10 and end plates 7, 9 are put together with the arrangement only held loosely together until the assembly is secured to the shaft of a drive motor (not shown). Typically the end plates 7,9 are solid one piece aluminium plates while the pins 6 are of a solid round soft steel construction having one end with a straight knurl to provide an interference fit into the end plate 7,9 when the assembly is put together. One disadvantage of this arrangement is that the hub assembly can often fall apart before it is placed onto the drive shaft requiring reassembly of the components.

Figure 1:
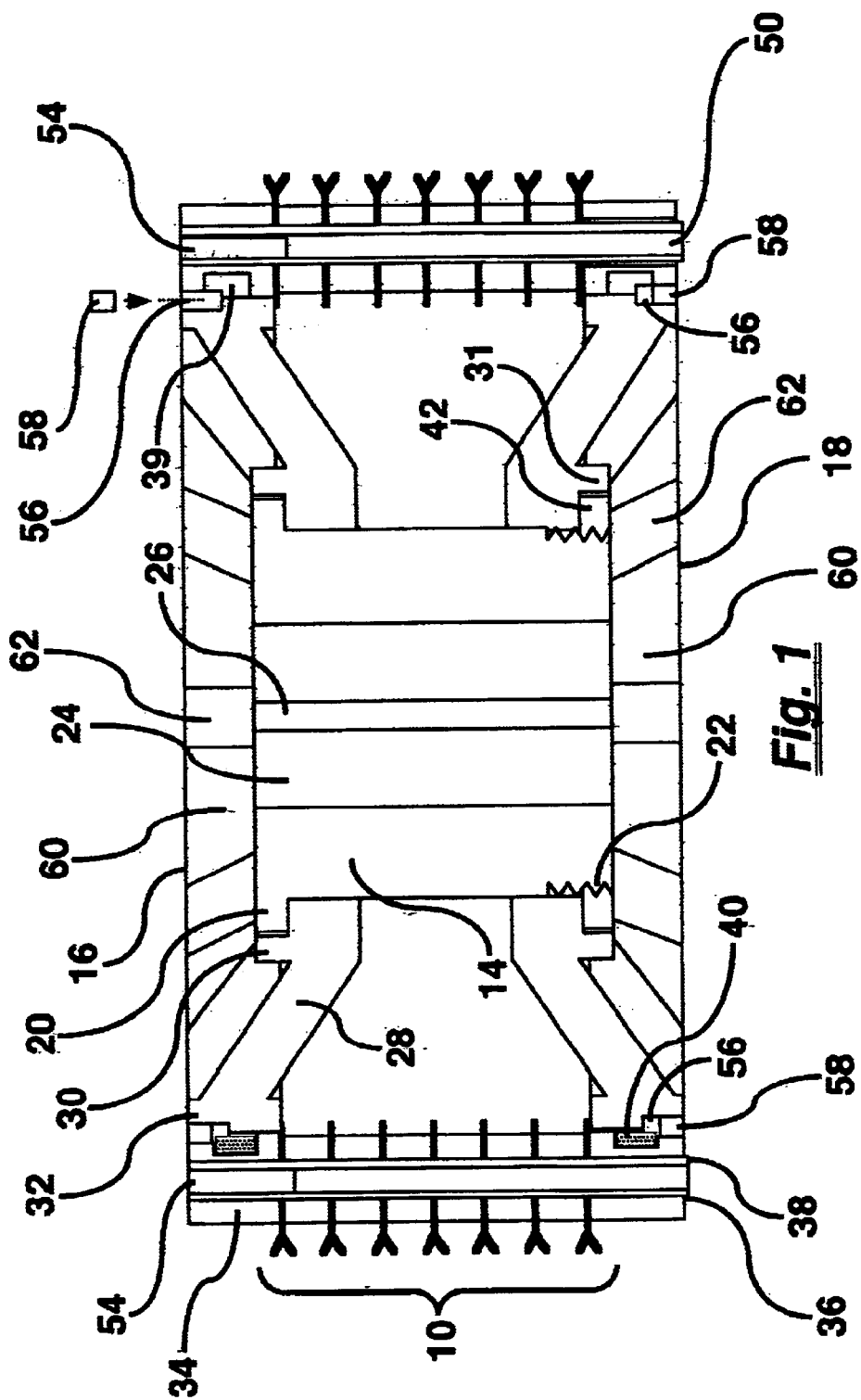
FIG. 1 shows a cross sectional view of a rasp blade hub assembly according to the invention.

According to one embodiment of the invention, as shown in FIG. 1, the core 10, for example as shown in FIG. 3, is accommodated in a central portion of the assembly about the cylindrical sleeve 14 and between end plates 16 and 18. The cylindrical sleeve 14 has at one end a flange 20 and at its other end a screw threaded portion 22. The cylindrical sleeve 14 has a hollow interior 24 through which is accommodated the shaft (not shown) of a drive motor to which the hub assembly is mated when the hub assembly is in use.

Each of the end plates 16, 18 has a truncated conical section 28 with a stepped flange 30 at the outward facing, inner radius of the section 28. At the outer radius of the truncated conical section 28 is a tangential flange 32 to which is affixed a ring 34. The ring 34 is of a hardened steel and has apertures 36 therethrough for accommodating pins 38. A circumferential cavity 39 is enclosed within the ring 34 and can be filled with or emptied of flowable material 40, for example a liquid or a powered material in order to be able to balance the assembly as required. The cavity 39 can be filled or emptied via drain(s) 56 which can be closed with a stop or plug 58.

The end plates 16, 18 may be of a solid construction but are preferably made of a ribbed construction leaving apertures for the circulation of air therethrough as the hub assembly rotates on the drive motor. This provides for a lighter weight end plate as well as for cooling of the hub assembly. Heat generated from the friction between the rasp blades and the tire being buffed is conveyed to the end plates. If this heat is not conveyed efficiently away from the core 10 and the rasp blades of the assembly, a raised core temperature may damage the rubber of the tire being buffed, the quality of the buffed surface for bonding and/or the lifetime of the blades.

A plurality of holes or apertures 36 are arranged about the ring 34 to accommodate pins 38 therein. The pins 38 are preferably hollow with a smooth exterior, according to one aspect of the invention, and are secured in place by a plug 54 which can be inserted into the interior 50 of the pin 38 and the pin 38 expanded outwardly by compressing the plug 54 within the hollow 50 to force the smooth exterior of the pin against the aperture 36 of the ring 34.

The hub assembly is assembled in the following manner. The core 10 is put together and placed between the end plates 16,18 with pins 38, having a hollow interior 50, inserted through the apertures 36 in the respective rings 34 on each of the end plates 16,18. The cylindrical sleeve 14 is inserted so that the flange 20 rests against the stepped portion 30 of the end plate 16. A nut 42 is then threaded onto the threaded portion 22 at the other end of the cylindrical sleeve 14 resting in stepped portion 31 and tightened. A tapered plug 54 is inserted into each pin 38 and located at a near or distal end of the pin in the region of a ring 34. The plug 54 is prevented from exiting from the open aperture of the pin by an external stop (not shown) (or conversely the pin may be closed at that end) while the plug is compressed, for example, by being hit with a punch, the material of the plug expanding the pin to lodge the pin in the aperture of the ring. The plug 54 may be located at either end of the pin and in the region of either ring of the pair of end plates.

The cavity 39 can accommodate flowable material 40 as stated above. A single circumferential cavity is preferred, although a number of separate cavities extending along a circumference and arranged symmetrically is also contemplated. By "flowable" material is meant that the material can be freely distributed about the volume of the cavity (or cavities) due to the forces acting on the hub as it rotates whereby any imbalance in these forces can be corrected. The hub assembly may then be balanced by adding or removing such flowable material. The amount of material will depend upon the configuration and construction of the hub assembly. The benefit of having the cavity is that as the hub is used and is worn or accretes rubber or dirt thereon, the hub assembly can still be balanced by suitable additions to or removals from the cavity. Obviously, by keeping the hub assembly balanced the deterioration of the hub assembly may be minimised and the life of the blades extended. There is also no need to disassemble the hub assembly in order to re-balance the hub as the balancing can be done in situ.

In the present invention the flowable material may be included in the cavity at manufacture or may be added subsequently during the lifetime of the hub assembly. It is contemplated that provision can be made for removing as well as adding material to the cavity by vacuum or pressure techniques. For these purposes more than one access to the cavity may be provided.

The end plates 16, 18 can be made of a light weight material such as aluminium whereas the ring 34 is made of a hardened steel as the ring has to bear the principle stresses and centrifugal forces associated with the hub assembly in use.

The cylindrical sleeve 14 may be made of aluminium or of any other material within the knowledge of a person skilled in the art.

The central portion of each end plate 16, 18 is preferably formed with radially extending apertures 60 to provide air circulation and to minimise the material used. The apertures 60 give a ribbed appearance to the end plates 16,18.

Figure 2:
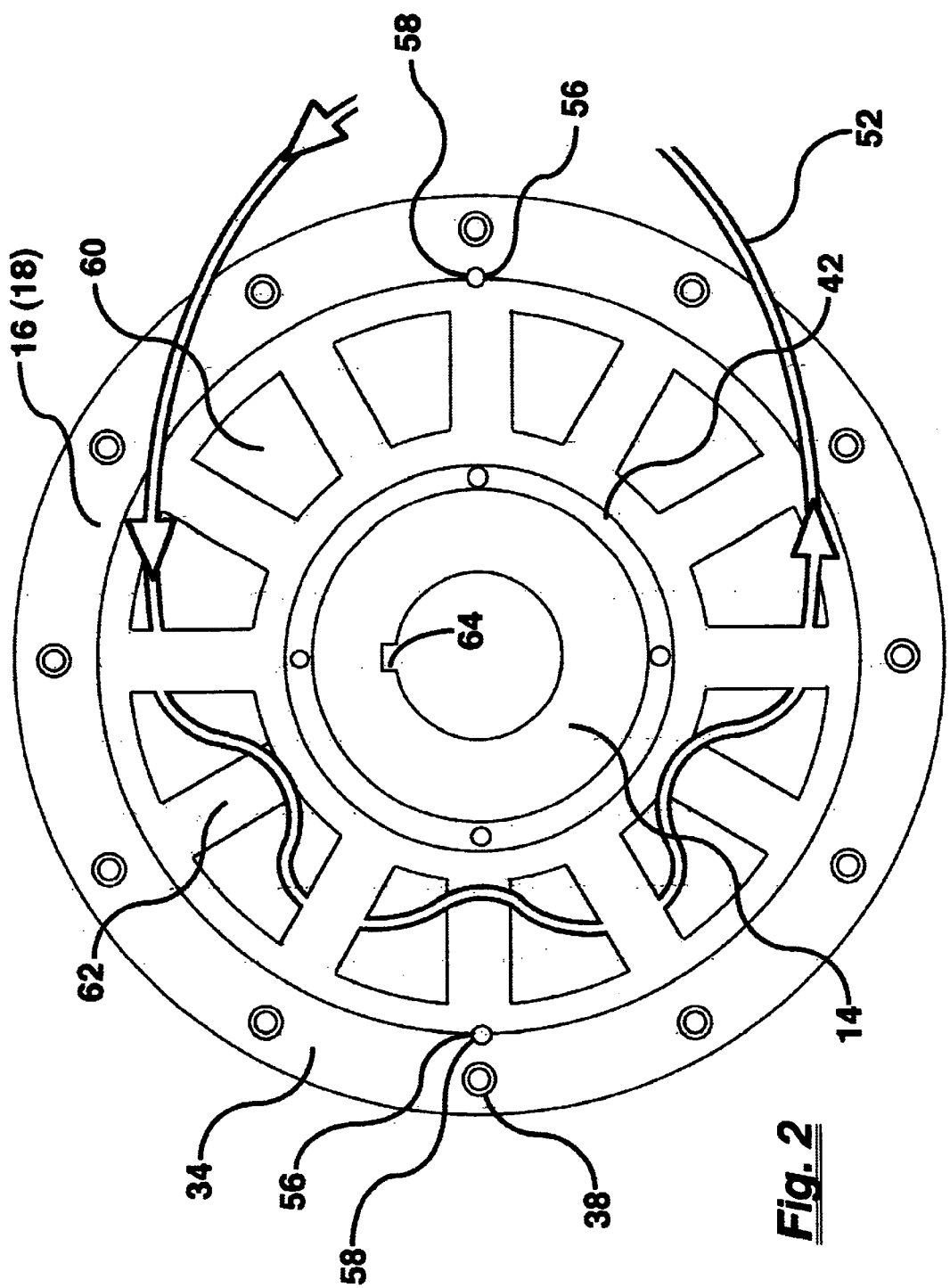
FIG. 2 shows an end view of the hub assembly of FIG. 1 according to the invention.

FIG. 2 is an end on view of the embodiment of FIG. 1 and is a schematic showing one example of how air circulates, as shown by arrow 52 through the ribs 62 of the end plate 16 (18). As shown, pins 38, in this case 12 of them, are arranged about the periphery of the ring 34. The cylindrical sleeve 14 has a keyway 64 for locating the hub assembly on the shaft of the drive motor (not shown). There may be more than one keyway, the purpose of which is to prevent slippage of the hub assembly on the drive shaft. Alternatively a spline drive may be used or the assembly may have a square hole for fitting onto a square drive shaft. The apertures 60 in the end plates may be configured in a number of ways to improve or facilitate the circulation of air about the end plate 16, 18.

Although the invention has been described above with respect to preferred embodiments thereof variations therein are contemplated within the knowledge of a person skilled in the art.

For example, the assembly may be put together with the pins fixed into one or both of the ring or rings before the sleeve is tightened. Equally, the pins may be joined into the rings first (for example a half in each ring) and the blades and spacers added to one such set of end plate and pins with the other end plate added after the core has been formed before the sleeve is added and tightened. The preferred embodiment employs a frustro-conical end plate, an end plate of a discoid shape or a curved shape such as a convex or a concave shape is also contemplated.

I claim:

1. A rasp blade hub assembly including a first and a second end plate, each of said end plates extending between an outer and an inner radius, a stepped flange portion at said inner radius of each said end plate, a cylindrical sleeve having at one end a flange for cooperating with said stepped flange portion of one of said end plates while having a threaded portion at the opposite end of said cylindrical sleeve for engaging a nut accommodated within the stepped flange portion of said other of said end plates, whereby with rotation of said nut along said threaded portion said end plates are drawn together or loosened depending on the direction of said rotation.

2. A rasp blade assembly as claimed in claim 1 further including a plurality of rasp blades, spacers and pins, each said pin extending through apertures in said rasp blades and spacers of said hub assembly and terminating in an aperture in each said end plate of the said hub assembly, each said pin being secured frictionally within said aperture of said end plate.

3. A rasp blade hub assembly as claimed in claim 2 wherein said pin has a hollow interior and a smooth exterior.

4. A rasp blade hub assembly as claimed in claim 3 wherein said pin has at least one open end.

5. A rasp blade hub assembly as claimed in claim 2 further including a core made up of a plurality of spacers, rasp blades and locating pins, the core and the assembly being secured together by tightening the nut on the cylindrical sleeve to draw the end plates together about the core, wherein each said end plate has apertures for accommodating said locating pins to hold the rasp blades and spacers of the assembly in alignment.

6. A rasp blade hub assembly as claimed in claim 5 wherein each of the end plates has a series of holes or apertures in each end plate producing a ribbed or spoked appearance allowing circulation of air about each said end plate as the assembly rotates.

7. A rasp blade hub assembly as claimed in claim 6 wherein each said end plate is of a truncated conical shape.

8. A rasp blade hub assembly as claimed in claim 7 wherein each said end plate has a ring affixed to the perimeter thereof at the outer radius, said ring having said apertures for accommodating the pins holding said rasp blades and spacers of the assembly in alignment.

9. A rasp blade hub assembly as claimed in claim 8, wherein each said ring has at least one enclosed cavity therein.

10. A rasp blade hub assembly as claimed in claim 9, wherein said cavity is located on the inner radius of said ring towards the said perimeter, extends along said perimeter and is filled with flowable or fluidic material whereby the hub assembly can be balanced.

11. A rasp blade hub assembly as claimed in claim 10 wherein said flowable material is sand.

12. A rasp blade hub assembly as claimed in claim 11 wherein at least one aperture is provided in the ring for filling or emptying said at least one cavity.

13. A rasp blade hub assembly as claimed in claim 12 wherein a single circumferential cavity is arranged about said perimeter.

14. A rasp blade hub assembly as claimed in claim 12 wherein a number of separate cavities are arranged circumferentially about said perimeter.

15. A rasp blade hub assembly as claimed in claim 12 wherein said ring is a hardened steel ring and is secured to said outer perimeter of each of said end plates by adhesive bonding.

16. A rasp blade hub assembly as claimed in claim 12 wherein said ring is a hardened steel ring and is secured to said outer perimeter of each of said end plates by welding.

17. A rasp blade hub assembly including:
- a pair of end plates, each end plate extending between an inner and an outer radius with a stepped portion at said inner radius;
- a cylindrical sleeve having at one end a stepped flange for engaging the stepped portion of one of said end plates and at said other end a screw thread, a nut locatable in the stepped portion of the other of said end plates and engaging said screw thread of said cylindrical sleeve whereby movement of said nut along said screw thread moves said end plates towards or away from each other;
- a pair of rings, each ring fixed along the outer radius of each of said end plates, each said ring having a plurality of apertures for accommodating therein respective pins, each said ring having at least one enclosed cavity for accommodating a flowable mass;
- a plurality of pins, each said pin being hollow and secured within a respective aperture of said ring by a plug, said plug being expandable upon compression of said plug within said hollow of said pin; and said plurality of pins holding components of a core in alignment, said core including a stack of rasp blades separated by spacer means, said rasp blades and said spacer means being arranged in annular rows, each row comprising a plurality of arcuate rasp blades and spacer means arranged about the longitudinal axis of said core, each said rasp blade and each said spacer means having a plurality of apertures therein for accommodating said pins therethrough.

18. A method of assembly of a rasp blade hub assembly, said hub assembly including a pair of end plates, each end plate extending between an inner and an outer radius and having a stepped portion at said inner radius;
- a cylindrical sleeve having at one end a stepped flange for engaging the stepped portion of one of said end plates and at said other end a screw thread, a nut locatable in the stepped portion of the other of said end plates and engaging said screw thread of said cylindrical sleeve;
- a pair of rings, each ring fixed along the perimeter at the outer radius of a respective said end plate, each said ring having a plurality of apertures for accommodating therein respective pins, each said ring having at least one enclosed cavity for accommodating a flowable mass;
- a plurality of pins, each said pin being hollow and secured within a respective aperture of at least one of said rings by a plug; and said plurality of pins holding components of a core in alignment, said core including a stack of rasp blades separated by spacer means, said rasp blades and said spacer means being arranged in annular rows, each row comprising a plurality of arcuate rasp blades and spacer means arranged about the longitudinal axis of said stack, each said rasp blade and each said spacer means having a plurality of apertures therein for accommodating said pins therethrough, said method including
  a) forming said core by stacking a plurality of rasp blades in annular rows onto pins with each row separated by spacer means and made up of a plurality of arcuate rasp blades;
  b) placing said core between said end plates with each end of said pins in an associated aperture of a respective ring;
  c) inserting said sleeve so as to contact and extend between said inner radii of said end plates, applying a nut to said screw thread and tightening;
  d) inserting a plug into the hollow interior of a pin, advancing said plug and compressing said plug in the region of said ring; and
  e) repeating step d) for all pins.

19. A method for securing together components of a rasp blade hub assembly including a plurality of rasp blades, spacers and rasp blade hub pins, each said pin having a hollow interior and a smooth exterior, each said pin extending through apertures in said rasp blades and spacers of said hub assembly and terminating in an aperture in an end plate of the said hub assembly, each said pin being secured frictionally within said aperture of said end plate by inserting a plug into said hollow interior of said pin and compressing the plug within said hollow interior of said pin in order to wedge said exterior of said pin within said aperture of said end plate, each said rasp blade hub pin extending between a first and a second said end plate, each of said end plates extending between an outer and an inner radius, a stepped flange portion at said inner radius of each said end plate, a cylindrical sleeve having at one end a flange for cooperating with said stepped flange portion of one of said end plates while having a threaded portion at the opposite end of said cylindrical sleeve for engaging a nut accommodated within the stepped flange portion of said other of said end plates, whereby with rotation of said nut along said threaded portion said end plates are drawn together or loosened depending on the direction of said rotation.

* * * * *